Figure 1:
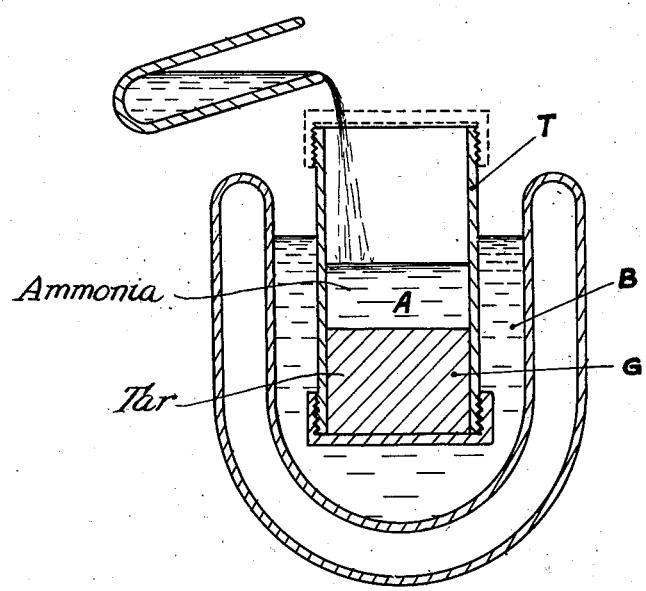

May 14, 1935.  R. M. JARRY  2,001,613

METHOD OF EXTRACTING THE PHENOLS OF TARS AND SIMILAR MIXTURES

Filed April 27, 1931

R. M. Jarry
INVENTOR

Patented May 14, 1935

2,001,613

UNITED STATES PATENT OFFICE 2,001,613

METHOD OF EXTRACTING THE PHENOLS OF TARS AND SIMILAR MIXTURES

Robert Marie Jarry, Paris, France

Application April 27, 1931, Serial No. 533,331
In France May 9, 1930

6 Claims. (Cl. 260—154)

It is well known that tar, obtained by low temperature distillation (about 400°-600° C.) from combustible minerals (coal, lignites, bituminous shale and the like), contains hydrocarbons similar to those found in petroleum, principally acyclic hydrocarbons, a considerable proportion (which may amount to as much as 50%) of constituents more or less of the phenol type, hereinafter referred to as "complex phenols", and a small quantity of nitrogeneous substances, which are pyridine bases and aromatic amines.

The "complex phenols" do not comprise substantially either proper phenol (carbolic acid) or cresol; they are likely carbides with an aromatic ring having one or more phenolic characteristics and a certain number of side chains.

Whatever is the process which is to be used afterwards in treating the "primary tar", such as for instance distillation, cracking, or catalytic hydrogenation, it is found necessary to separate at first the "complex phenols" which have corrosive action on metallic parts.

There have been provided several methods for that purpose. One method consists in neutralizing the primary tar by means of a caustic soda lye; the sodium phenates thus obtained are separated and treated with carbonic gas so as to liberate the phenols; the sodium carbonate is treated with lime in order to liberate the caustic soda which returns in the cycle of fabrication. This method is not economical on account of its complexity and of the resultant losses incidental thereto.

Another method consists in taking out the phenols by means of overheated steam. This method is also expensive by reason of the very large amount of steam it requires and of the important expense of fuel.

A further method consists in separating the phenols with alcohol. With this method, it is very difficult to separate the phenols from the alcohol; the phenols are obtained in a water solution.

The present invention has for its object a method of extraction of the "complex phenols", pyridine bases, and amines comprised in a natural or synthetical mixture of phenols, hydrocarbons, pyridine bases, amines or the like, and to make use of the liquefied ammonia gas as a phenol dissolvent. When the liquefied ammonia gas and such mixture is intimately mixed, it will be noted that:

(a) There occur two phases, which, when the ammonia gas has been evaporated, leaves respectively a residue containing the greater part of the neutral oils and a residue containing the greater part of the phenols and pyridine bases and the like:—

(b) The separation of these two phases is industrially practicable by taking advantage, either of the difference between the solidification points of the two phases so as to collect one of them in the solid state (as in the first described experiment), or of the easy separation in the liquid state of the two phases which do not constitute generally together an emulsion incoercible by the usual natural or mechanical means.

The hereinafter described experiments make evident the interest of using liquefied ammonia gas as an agent for extracting the phenols and the pyridine bases from materials which contain said substances mixed with hydrocarbons.

In a first series of experiments phenol oil and neutral oil, both obtained by distilling coal, have been mixed; and it is possible to completely separate the two oils when shaking the mixture into a trial pipe with liquefied ammonia gas.

In a further series of experiments, the tar obtained at low temperature was poured into a Dewar vessel containing liquefied ammonia gas. At a temperature of (—33° C.) the tar coagulated in a plastic mass; said mass is malaxed so that every part thereof comes into contact with liquid ammonia. After a certain time, the liquid is collected, which is to be called hereinafter the "extract". After the liquid ammonia evaporates, the extract remains as a residue, which is an oil consisting for the most part of phenols, with which the pyridine bases and amines are mixed. The latter may be extracted by means of sulphuric acid.

The pasty residue, when brought to the normal temperature, stands as a neutral oil containing only a reduced percentage of phenols.

The hereinabove described method, being carried into practice when treating 60 cm³ of low temperature tar obtained in an Hereng furnace and free from dust and coal particles, gave 22 cm³ of phenolic oil and 36 cm³ of neutral oil which, under the usual reagent (chloroform + caustic potash in tablets) has shown only traces of phenol.

This latter method, though being industrially practicable offers a drawback in the fact that it requires malaxing a pasty material at a somewhat low temperature; and this necessitates a complication in the machinery.

The method, carried into practice in the third series of experiments that is now to be described shows that the separation in two phases may be produced also in an entirely liquid medium; such a method simplifies the industrial machinery, as the liquid phases can be easily separated by decantation.

Figure 2:
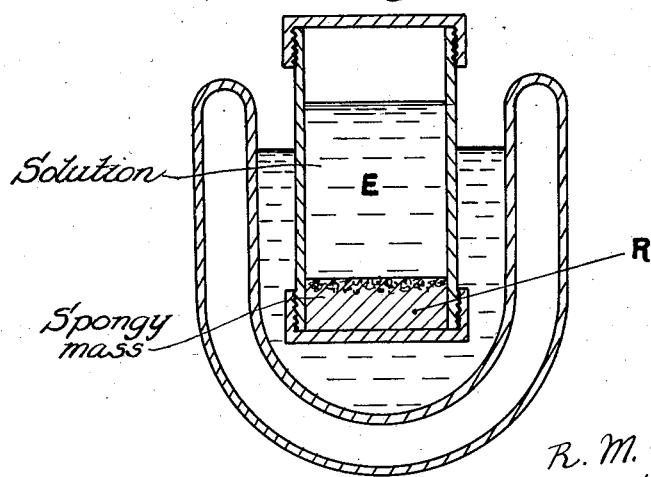

Figures 1 and 2 show diagrammatically, by way of example, two different stages of the application of the method.

According to the method, the operation is made at the ordinary temperature, about 17° C., under the pressure of the vapor of the mixture at the said temperature.

The apparatus comprises an iron pipe T, of 150 millimeters in length and 34 mm. in internal diameter; the said pipe may be closed at its two ends by screw-threaded plugs; the tightness of the fastenings is ensured by means of joints in tallowed leather, disposed at the bottom of each plug, and packing thread wound around the screw-threaded part of the iron tube. The upper closing member being removed, a certain quantity of tar G, under the atmospheric pressure, is poured into the pipe, which is then disposed in a bath B of liquefied and boiling ammonia gas; when the temperature equilibrium has been reached, liquefied ammonia gas A is poured into the pipe so as to obtain the desired proportion (measured for example by means of a gauge immersed in the liquid).

The pipe is then hermetically closed by screwing down the upper closing member.

After having been hermetically sealed, the pipe is brought back to the surrounding temperature, and then shaken violently.

The pipe is normally disposed vertically, and then dipped in the bath of liquefied and boiling ammonia gas. When the temperature has been attained again, the pipe is opened. By a mere inclination of the tube, the ammoniacal extract E may be discharged while a coagulated spongy mass R remains at the lower part of the pipe. The ammoniacal solution E is a solution of "acid oil" and pyridine bases in anhydrous ammonia, while the coagulated spongy mass consists mostly of "neutral oil".

The method of operation hereinabove described confirms the fact that the formation of the two phases and their decantation are effected in an entirely liquid state.

The following table is a resume of the quantitative results of the third series of experiments.

The product was raw tar obtained by distilling at low temperature a fat coal, and having been previously preliminarily distilled so as to eliminate the dust. Tar being soluble into caustic soda at 58 per cent, the remaining 42 per cent are thus nonsoluble.

|  | First experiment | Second experiment |
| --- | --- | --- |
| Weight of material treated | 60 gr | 34 gr. |
| Volume of ammonia employed | 45 cc | 75 cc. |
| Duration of decanting at 17° C | 20 min | 10 min. |
| Soluble into ammonia | 45 gr | 23 gr. |
| Residue non-liquid at −33° | 15 gr | 11 gr. |
| Weight of said residue that may be extracted with caustic soda | 1 gr | 1 gr. 5. |
| Neutral oil obtained | 14 gr | 9 gr. 5. |

The method according to the invention presents the following advantages relatively to those actually in use:

(a) it is a purely physical method which allows an easy and complete recovery of the employed solvent;

(b) it is carried into practice at nearly the ordinary temperature, thus requiring only a small consumption of energy; the calories provided for the ammonia vaporization may be recuperated in great part;

(c) the necessary machinery is very simple.

What I claim is:

1. A method of extracting the complex phenols of low temperature tars and similar mixtures, which consists in adding to the treated product liquefied ammonia gas of a quantity required for dissolving the complex phenols, effecting an intimate mixture, and then allowing two distinct phases to form, one of which is formed by the liquefied ammonia gas dissolving the complex phenols, to a physical state so that they can be separated mechanically, then finally separating these two phases mechanically and then extracting the complex phenols from the phase containing them.

2. A method according to claim 1, which consists in mixing the treated products with liquefied ammonia gas having a temperature of about −33° C, malaxing the pasty phase and the liquid phase which are formed and collecting the liquid phase which is formed by the liquefied ammonia gas having dissolved the complex phenols.

3. A method according to claim 1, which consists in mixing the treated product with liquefied ammonia gas having a temperature of about −33° C, placing the entire mixture in a closed vessel, subjecting the same to a temperature that is sufficient for obtaining a good fluidity of the treated product, shaking the mixture and then allowing it to settle whereupon it is brought back to the temperature of about −33° C, and finally collecting the liquid phase which is formed by the liquefied ammonia gas having dissolved the complex phenols.

4. A method according to claim 1, which consists in mixing the product to be treated with liquefied ammonia gas, subjecting the entire mixture to a temperature that is sufficient for obtaining a good fluidity of the treated product, shaking the mixture, allowing it to settle, allowing two non-miscible liquid phases to form and finally separating the two liquid phases.

5. Method for the obtention of high per cent phenol products containing 80 to 90% of phenol from raw coal tars and lignite coal tars with liquefied ammonia, consisting in treating the tars with liquefied ammonia, in separating after the stratum layer formation has been completed the strata in liquid condition the one from the other, and in removing the ammonia in a suitable manner.

6. Method for the obtention of high per cent phenol products containing 80 to 90% of phenol from raw coal tars and lignite coal tars with liquefied ammonia, consisting in treating the distillation products of the tars with liquefied ammonia, in separating after the stratum layer formation has been completed the strata in liquid condition the one from the other, and in removing the ammonia in a suitable manner.

ROBERT MARIE JARRY.